United States Patent
Alglave et al.

(10) Patent No.: US 12,485,597 B2
(45) Date of Patent: Dec. 2, 2025

(54) ACOUSTIC ATTENUATION STRUCTURE AND METHOD FOR MANUFACTURING SAME

(71) Applicant: SAFRAN, Paris (FR)

(72) Inventors: Hugues Laurent Alglave, Moissy-Cramayel (FR); Patrick Dunleavy, Moissy-Cramayel (FR); Nicolas Pierre Lanfant, Moissy-Cramayel (FR); Cédric Pierre Michel Thomas, Moissy-Cramayel (FR)

(73) Assignee: SAFRAN, Paris (FR)

( * ) Notice: Subject to any disclaimer, the term of this patent is extended or adjusted under 35 U.S.C. 154(b) by 156 days.

(21) Appl. No.: 17/915,852

(22) PCT Filed: Mar. 30, 2021

(86) PCT No.: PCT/FR2021/050555
§ 371 (c)(1),
(2) Date: Sep. 29, 2022

(87) PCT Pub. No.: WO2021/198610
PCT Pub. Date: Oct. 7, 2021

(65) Prior Publication Data
US 2023/0131268 A1  Apr. 27, 2023

(30) Foreign Application Priority Data

Mar. 30, 2020 (FR) ........................ 2003124

(51) Int. Cl.
*B29C 45/56* (2006.01)
*B29L 7/00* (2006.01)
*G10K 11/162* (2006.01)

(52) U.S. Cl.
CPC .......... *B29C 45/561* (2013.01); *G10K 11/162* (2013.01); *B29L 2007/002* (2013.01)

(58) Field of Classification Search
None
See application file for complete search history.

(56) References Cited

U.S. PATENT DOCUMENTS 5,912,442 A    6/1999  Nye et al.
2013/0186707 A1  7/2013  Richter
(Continued)

FOREIGN PATENT DOCUMENTS

CN    1820304 A    8/2006
CN    105493176 A    4/2016
(Continued)

OTHER PUBLICATIONS

International Search Report as issued in International Patent Application No. PCT/FR2021/050555, dated Jun. 30, 2021.
(Continued)

*Primary Examiner* — Jacob T Minskey
*Assistant Examiner* — Virak Nguon
(74) *Attorney, Agent, or Firm* — Pillsbury Winthrop Shaw Pittman LLP

(57) ABSTRACT

A method for manufacturing an acoustic attenuation structure including a complex acoustic multi-element panel extending along a horizontal and a vertical direction and an acoustic skin covering one of horizontal faces of the complex acoustic multi-element panel, the complex acoustic multi-element panel including complex acoustic elements each having a shape gradually narrowing between a base and a tip and partitions surrounding each complex acoustic element to form a plurality of acoustic cells, the partitions extending along the vertical direction from the base of the complex acoustic elements, the complex acoustic multi-
(Continued)

element panel being produced by injection of a filled or unfilled thermoplastic or thermosetting material. The complex acoustic multi-element panel and the plurality of partitions are produced as a single part by injection of a filled or unfilled thermoplastic or thermosetting material.

4 Claims, 6 Drawing Sheets

(56) References Cited

U.S. PATENT DOCUMENTS

| | | | |
|---|---|---|---|
| 2015/0027629 A1* | 1/2015 | Butler | G10K 11/168 |
| | | | 156/306.6 |
| 2019/0063318 A1* | 2/2019 | Roach | E04B 1/84 |
| 2020/0265821 A1* | 8/2020 | Riccobene | B29C 39/026 |

FOREIGN PATENT DOCUMENTS

| | | |
|---|---|---|
| CN | 107251136 A | 10/2017 |
| CN | 109421918 A | 3/2019 |
| FR | 3 082 987 A1 | 12/2019 |
| GB | 2 314 526 A | 1/1998 |
| WO | WO 2011/017188 A1 | 2/2011 |
| WO | WO-2019224499 A1 * | 11/2019 ............... B64C 7/02 |

OTHER PUBLICATIONS

First Office Action as issued in Chinese Patent Application No. 202180031317.X, dated Jun. 27, 2025.

* cited by examiner

[Fig. 1]
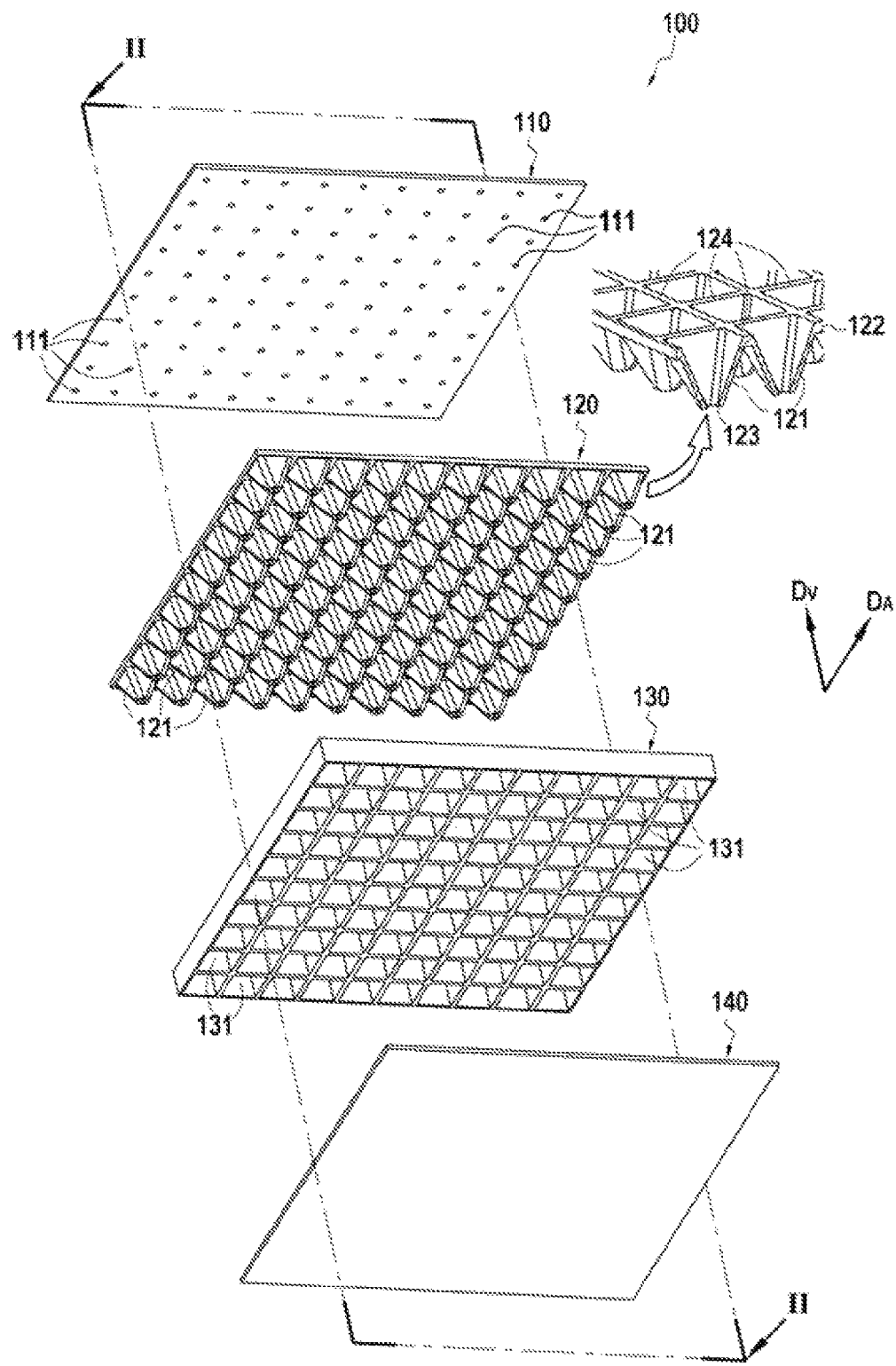

[Fig. 2]
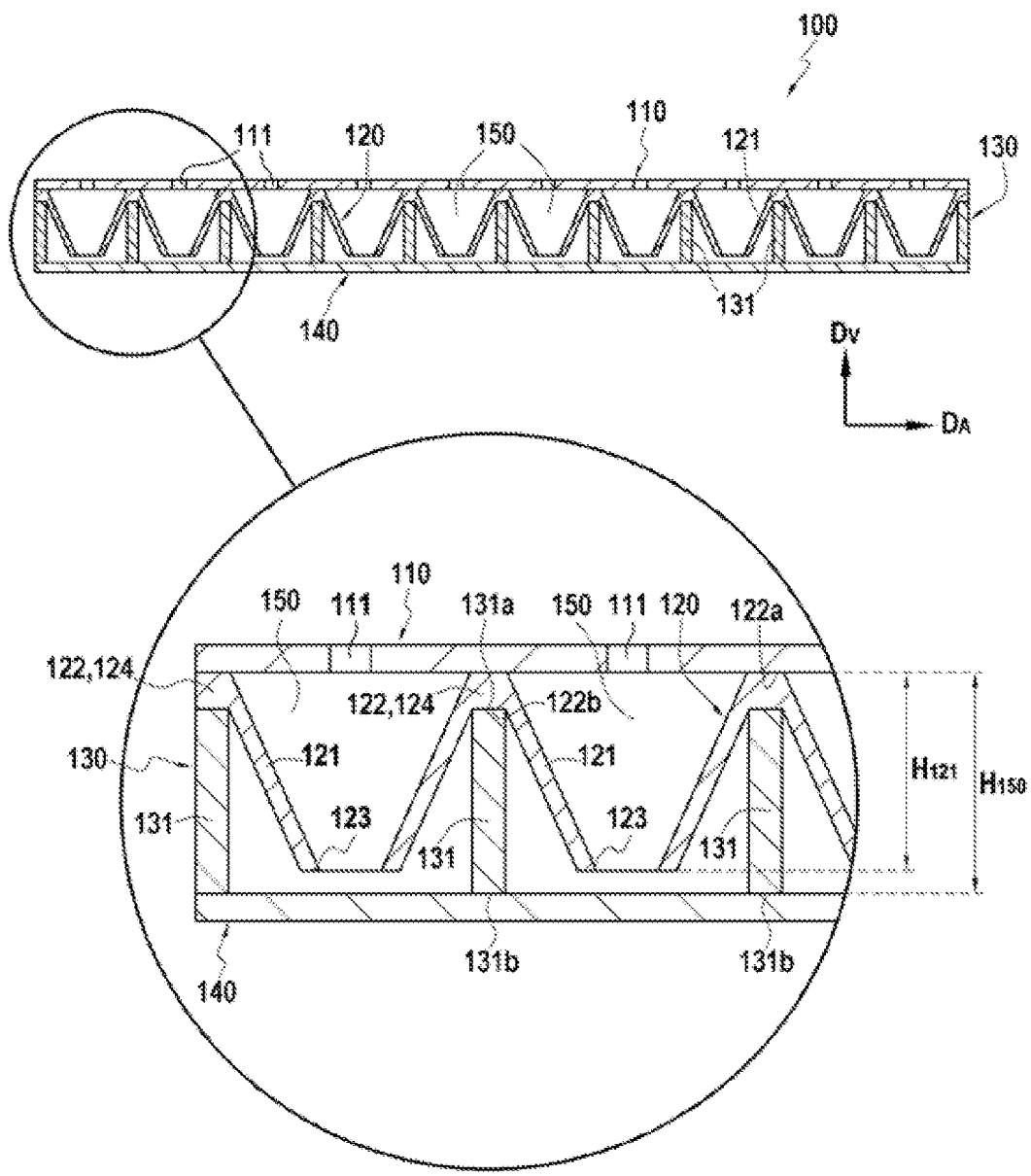

[Fig. 3]
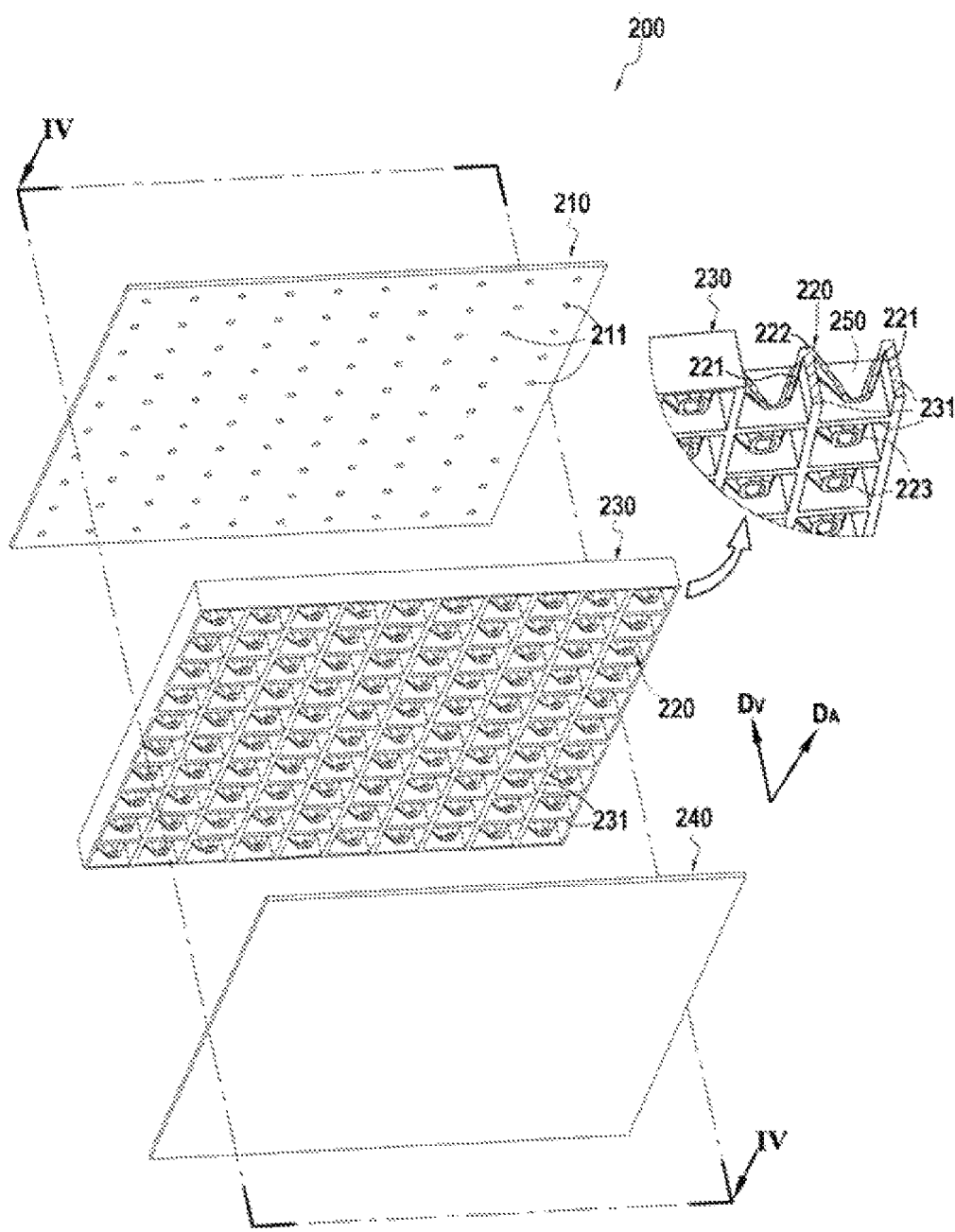

[Fig. 4]
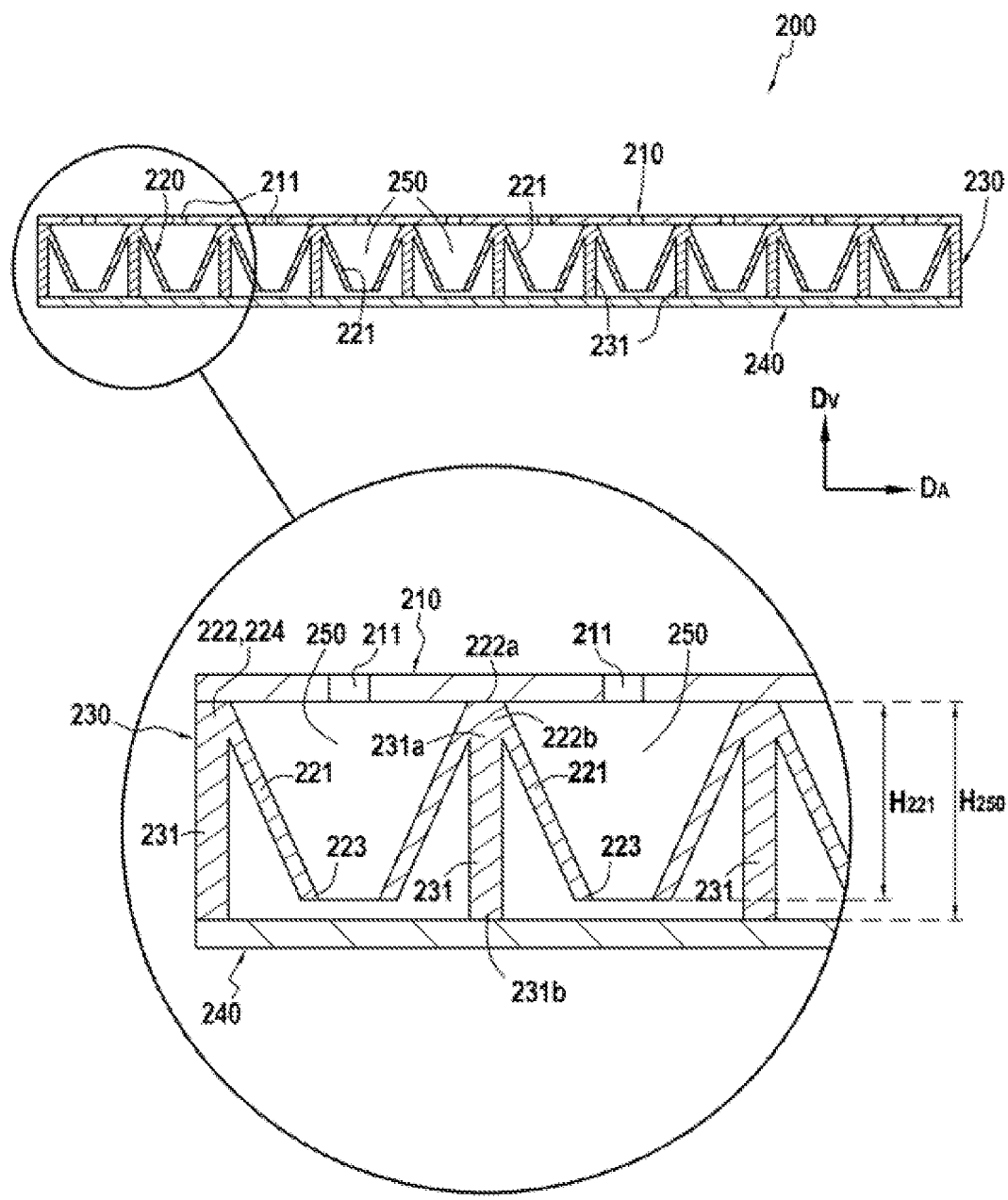

[Fig. 5]
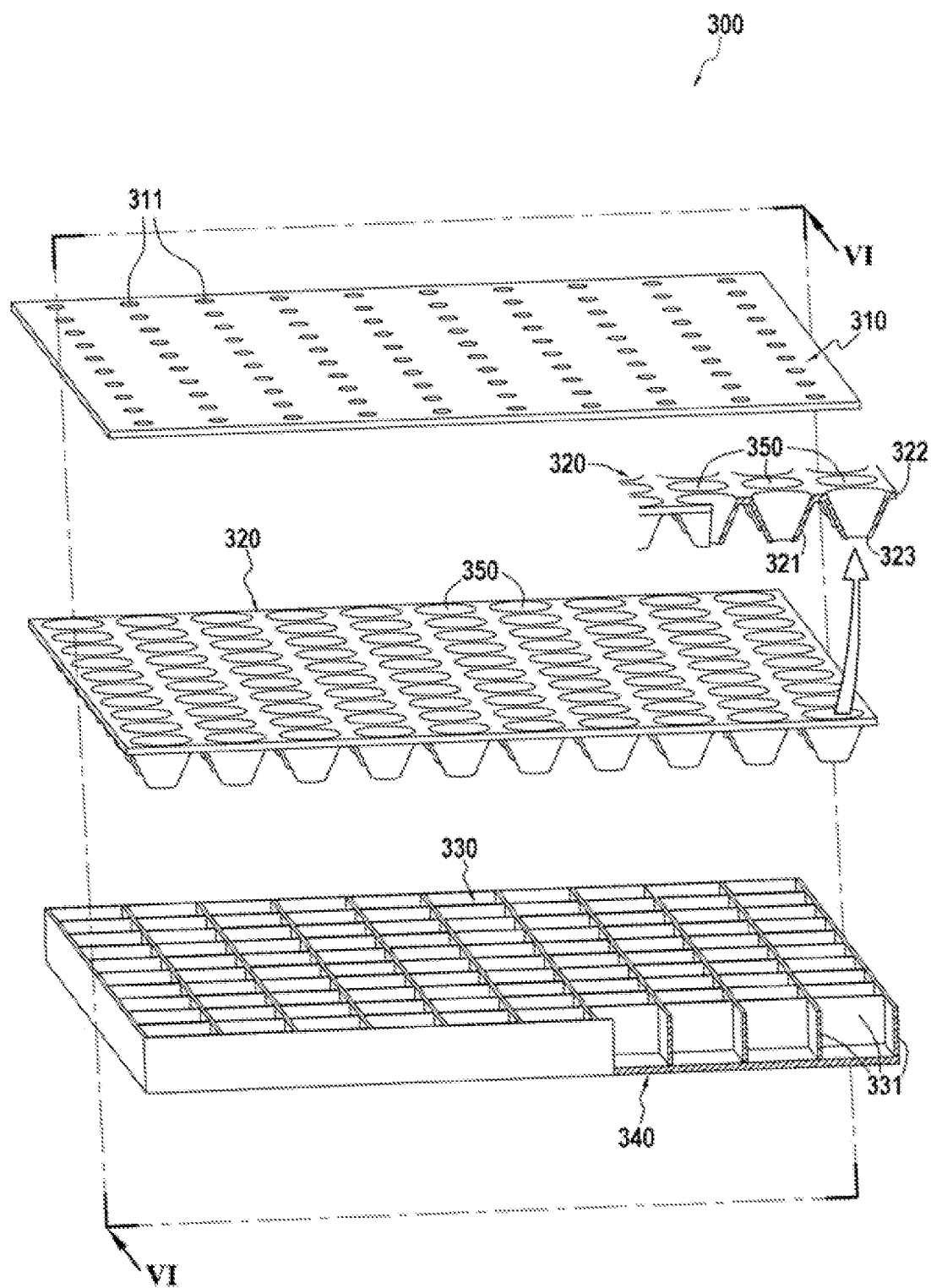

[Fig. 6]
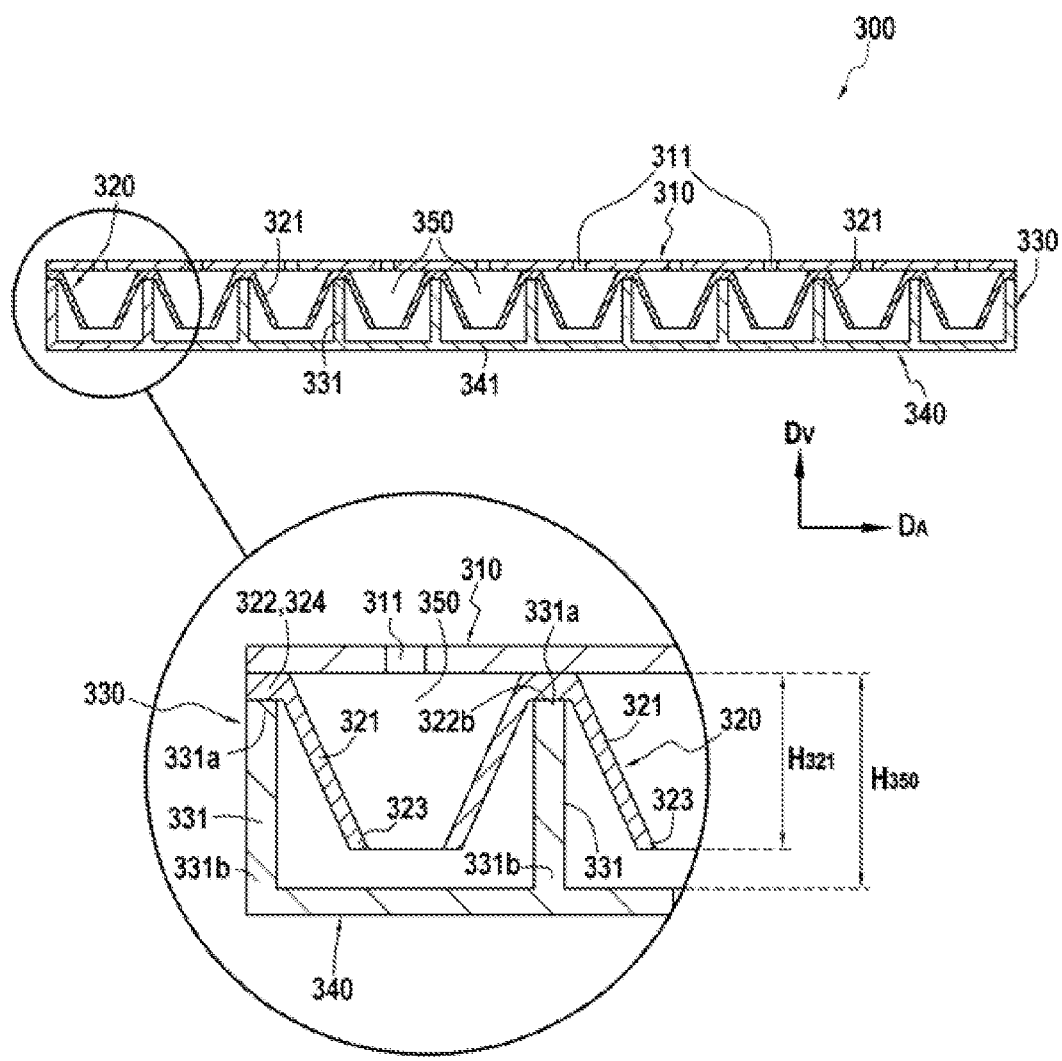

ACOUSTIC ATTENUATION STRUCTURE AND METHOD FOR MANUFACTURING SAME

CROSS-REFERENCE TO RELATED APPLICATIONS

This application is the U.S. National Stage of PCT/FR2021/050555, filed Mar. 30, 2021, which in turn claims priority to French patent application number 2003124 filed Mar. 30, 2020. The content of these applications are incorporated herein by reference in their entireties.

TECHNICAL FIELD

This invention relates to the general field of acoustic attenuation structures or panels. It more specifically relates to acoustic attenuation structures used to reduce the noise produced in airplane engines such as in gas turbines or the exhaust thereof.

PRIOR ART

Acoustic attenuation structures are typically composed of an acoustic surface plate or skin permeable to the acoustic waves one wishes to attenuate and a reflective solid plate or skin known as a "closing plate", a cellular body, such as a honeycomb or a porous structure, being disposed between these two walls. In a well-known manner, such panels form Helmholtz-type resonators that make it possible to attenuate acoustic waves within a certain frequency range. Acoustic attenuation structures of this type are in particular described in the documents U.S. Pat. No. 5,912,442 and GB 2 314 526.

These acoustic attenuation structures are limited to simple cell shapes such as recesses of a conventional NIDA® type structure. Consequently, the acoustic performance obtained is limited to the absorption of a very narrow frequency range.

One solution to increase the frequency range of the acoustic attenuation is to superimpose two cellular bodies having different shapes and dimensions of cell. This solution has the drawback of significantly increasing the overall dimensions of the acoustic attenuation structure.

Another known solution consists in placing open truncated cones in recesses, as described in the document FR 3 082 987. In the document FR 3 082 987, truncated cones are interconnected by strips which must be positioned in notches made at the ends of the recesses. However, this solution is difficult to implement, particularly as regards the control of the positioning between the truncated cones and the recesses, as well as the sealing between these elements. Specifically, if the geometry of the notches and that of the strips does not completely match, certain strips are not correctly positioned in the notches, which leads to clearances with the acoustic skin. The performance and sealing of the acoustic attenuation structure are then degraded.

SUMMARY OF THE INVENTION

This invention thus has the main aim of making provision for an acoustic attenuation structure which does not have the aforementioned drawbacks.

In accordance with this invention, this aim is achieved owing to an acoustic attenuation structure comprising a complex acoustic multi-element panel extending along a horizontal direction and a vertical direction and at least one acoustic skin covering one of the horizontal faces of the complex acoustic multi-element panel, said complex acoustic multi-element panel comprising a plurality of complex acoustic elements each having a shape gradually narrowing between a base and a tip and a plurality of partitions surrounding each complex acoustic element in such a way as to form a plurality of acoustic cells, said partitions extending along the vertical direction from the base of the complex acoustic elements, characterized in that the base of each complex acoustic element is in continuous contact with the base of the adjacent complex acoustic elements in such a way as to form a continuous network of edges and in that one end of the partitions is in contact with the edges of the network of continuous edges.

Owing to the presence of complex acoustic elements surrounded by partitions, the projected height of the cells is increased. The acoustic attenuation structure of the invention is thus able to attenuate sound waves at lower frequencies and, consequently, over more extended frequency ranges while having reduced overall dimensions. Furthermore, the retaining in position of the complex acoustic elements in the recesses formed by the partitions is completely ensured since the bases of the acoustic cells form a continuous network of edges in contact with the ends of the partitions, which prevents any risk of appearance of clearance in particular along the vertical direction. The seal between the complex acoustic elements, the partitions and the acoustic skin is also thus perfectly controlled.

According to a particular aspect of the acoustic attenuation structure of the invention, the complex acoustic elements have a pyramidal, conical or spinal shape.

According to another particular aspect of the acoustic attenuation structure of the invention, at least the complex acoustic multi-element panel is made of a filled or unfilled thermoplastic or thermosetting material. This makes it possible to control the overall mass of the structure since the complex acoustic elements can be formed by injection and have very small thicknesses.

According to another particular aspect of the acoustic attenuation structure of the invention, the height of the complex acoustic elements is between 10% and 99% of the height of the cells along the vertical direction.

Another subject of the invention is a method for manufacturing an acoustic attenuation structure comprising a complex acoustic multi-element panel extending along a horizontal direction and a vertical direction and at least one acoustic skin covering one of the horizontal faces of the complex acoustic multi-element panel, said complex acoustic multi-element panel comprising a plurality of complex acoustic elements each having a shape gradually narrowing between a base and a tip and a plurality of partitions surrounding each complex acoustic element in such a way as to form a plurality of acoustic cells, said partitions extending along the vertical direction from the base of the complex acoustic elements, characterized in that at least the complex acoustic element panel is produced by injection of a filled or unfilled thermoplastic or thermosetting material.

Producing the complex acoustic element by injection as a single part ensures great accuracy of positioning of the complex acoustic elements with respect to one another while greatly simplifying their manufacturing. Manufacturing by injection also makes it possible to control the overall mass of the structure since the complex acoustic elements can be formed with very small thicknesses.

According to a particular feature of the method of the invention, the complex acoustic multi-element panel is produced by injection-compression of a filled or unfilled thermoplastic or thermosetting material. As explained below in detail, injection-compression makes it possible to further reduce the wall thickness of the complex acoustic elements.

According to another particular feature of the method of the invention, the complex acoustic multi-element panel is produced by injection, with controlled tooling temperature, of a filled or unfilled thermoplastic or thermosetting material. As explained below in detail, injection-compression makes it possible to further reduce the wall thickness of the complex acoustic elements.

According to an embodiment of the method of the invention, the latter comprises the production of the plurality of partitions as a single part and the assembly of the complex acoustic multi-element panel with the plurality of partitions. The plurality of complex acoustic elements being formed as a single part within the complex acoustic multi-element panel and the plurality of partitions itself also being formed as a single part, the assembly of these elements together with one another is greatly facilitated by the self-positioning of the complex acoustic elements with the partitions.

According to another embodiment of the method of the invention, the complex acoustic multi-element panel and the plurality of partitions are produced as a single part by injection of a filled or unfilled thermoplastic or thermosetting material. The manufacturing of the acoustic attenuation structure is here greatly simplified since the complex acoustic elements are already positioned with respect to the partitions. All that is left to do is to attach the acoustic skin with no risk of clearance and with complete sealing.

According to another embodiment of the method of the invention, the acoustic attenuation structure further comprises a closing skin covering the horizontal face of the complex acoustic multi-element panel opposite the horizontal face covered by the acoustic skin, the closing skin and the plurality of partitions being formed as a single part, the method comprising the assembly of the complex acoustic multi-element panel with the part joining the closing skin and the plurality of partitions. The manufacturing of the acoustic attenuation structure is here also simplified since the partitions are secured to the skin, which allows the self-positioning of the complex acoustic elements with the partitions.

BRIEF DESCRIPTION OF THE DRAWINGS

FIG. 1 is a schematic exploded perspective schematic view of an acoustic attenuation structure according to an embodiment of the invention, FIG. 2 is a schematic section view of the acoustic attenuation structure of FIG. 1 once assembled, FIG. 3 is a schematic exploded perspective view of an acoustic attenuation structure according to another embodiment of the invention, FIG. 4 is a schematic section view of the acoustic attenuation structure of FIG. 3 once assembled, FIG. 5 is an exploded perspective view of an acoustic attenuation structure according to another embodiment of the invention, FIG. 6 is a schematic section view of the acoustic attenuation structure of FIG. 5 once assembled.

DESCRIPTION OF THE EMBODIMENTS

FIGS. 1 and 2 show an acoustic attenuation structure 100 in accordance with an embodiment of the invention. The acoustic attenuation structure 100 here comprises an acoustic skin or plate 110, a complex acoustic multi-element panel 120, a plurality of partitions 131 and a closing skin or plate 140.

The closing skin 140 corresponds to a solid surface intended to reflect the soundwaves entering into the acoustic attenuation structure. The closing skin can be a component element of the acoustic attenuation structure as in the example described here or be a structure of an object, for example an airplane engine. In the latter case, the acoustic attenuation structure of the invention does not include any closing skin and is directly mounted on the structure of the object.

The acoustic skin 110 has the function of letting the sound waves to be attenuated pass into the acoustic attenuation structure 100. For this purpose and in the example described here, the acoustic skin 110 comprises a plurality of perforations 111.

The complex acoustic multi-element panel 120 is formed as a single part and extends in length and in width along a horizontal direction $D_H$ and in height along a vertical direction $D_V$. The complex acoustic multi-element panel comprises a plurality of complex acoustic elements 121 each having a shape gradually narrowing between a base 122 and a tip 123. In the example described here, the complex acoustic elements 121 have a pyramidal shape. The base 122 of each complex acoustic element 121 is in continuous contact with the base of the adjacent complex acoustic elements in such a way as to form a continuous network of edges 124.

In the exemplary embodiment described here, the plurality of partitions 131 is produced as a single part, namely a network of ribs 130 which once assembled with the complex acoustic multi-element panel 120 forms the partitions around the complex acoustic elements 121.

Still in the example described here, the acoustic attenuation structure 100 is made by assembling the complex acoustic multi-element panel 120 with the plurality of partitions 131 as a single part, the upper edge 131a of the partitions 131 being attached, for example by bonding or soldering, onto the lower portion 122b of the bases 122 of the complex acoustic elements 121 (FIG. 2). The plurality of complex acoustic elements being formed as a single part within the complex acoustic multi-element panel and the plurality of partitions being itself also formed as a single part, the assembly of these elements together with one another is greatly facilitated by the self-positioning of the complex acoustic elements with the partitions.

The closing skin 140 is attached, for example by bonding or soldering, on the inner edge 131b of the partitions 131 while the acoustic skin 110 is attached, by bonding or soldering, onto the upper portion 122a of the bases 122 of the complex acoustic elements 121 corresponding to the exposed surface of the edges 124. Thus, the acoustic skin and the closing skin are each attached to a support that is completely flat along the horizontal direction $D_H$, which makes it possible to provide a very good seal between the skins and the assembly of the complex acoustic multi-element panels with the plurality of partitions.

Once assembled, the attenuation structure 100 comprises a plurality of acoustic cells 150 each formed by a complex acoustic element 121 and the partitions 131 that surround it (FIG. 2). The height $H_{121}$ of the acoustic cells 121 is less than the height $H_{150}$ of the acoustic cells 150. More precisely, the height $H_{121}$ of the acoustic cells is between 10% and 99% of the height $H_{150}$ of the acoustic cells along the vertical direction.

FIGS. 3 and 4 show another embodiment of an acoustic attenuation structure of the invention which differs from the illustrated structure in FIGS. 1 and 2 in that the complex acoustic multi-element panel and the plurality of partitions are formed as a single part. More precisely, the acoustic attenuation structure 200 here comprises an acoustic skin or plate 210, a complex acoustic multi-element panel 220, a plurality of partitions 231 and a closing skin or plate 240.

The closing skin 240 is a solid surface intended to reflect the sound waves entering into the acoustic attenuation structure. The closing skin can be a component element of the acoustic attenuation structure as in the exampled described here or be the structure of an object, for example an aircraft engine. In the latter case, the acoustic attenuation structure of the invention does not include any closing skin and is directly mounted on the structure of the object.

The acoustic skin 210 has the function of letting the sound waves to be attenuated pass into the acoustic attenuation structure 200 and here comprises a plurality of perforations 211.

In the exemplary embodiment described here, the complex acoustic multi-element panel 220 and the plurality of partitions 231 are formed together as a single part which extends in length and in width along a horizontal direction $D_H$ and in height along a vertical direction $D_V$. The complex acoustic multi-element panel comprises a plurality of complex acoustic elements 221 each having a shape gradually narrowing between a base 222 and a tip 223. In the example described here, the complex acoustic elements 221 have a pyramidal shape. The base 222 of each complex acoustic element 221 is in continuous contact with the base of the adjacent complex acoustic elements in such a way as to form a continuous network of edges 224.

In the exemplary embodiment described here, the plurality of partitions 231 is formed by a network of ribs 230 which surround the complex acoustic elements 221. The upper edge 231a of the partitions 231 extends from the lower portion 222b of the bases 222 of the complex acoustic elements 221 along the vertical direction $D_V$ (FIG. 4). In this embodiment, there is no positioning problem between the complex acoustic elements and the plurality of partitions since the complex acoustic multi-element panel is formed as a single part with the plurality of partitions.

The closing skin 240 is attached, for example by bonding or soldering, onto the lower edge 231b of the partitions 231 while the acoustic skin 210 is attached, by bonding or soldering, onto the upper portion 222a of the bases 222 of the complex acoustic elements 221 corresponding to the exposed surface of the edges 224. Thus, the acoustic skin and the closing skin are each attached to a support that is completely flat along the horizontal direction $D_H$, which makes it possible to ensure a very good seal between the skins and the assembling of the complex acoustic multi-element panel with the plurality of partitions.

Once assembled, the attenuation structure 200 comprises a plurality of acoustic cells 250 each formed by a complex acoustic element 221 and the partitions 231 that surround it (FIG. 4). The height $H_{221}$ of the complex acoustic elements 221 is less than the height $H_{250}$ of the acoustic cells 250. More precisely, the height $H_{221}$ of the complex acoustic elements is between 10% and 99% of the height $H_{250}$ of the acoustic cells along the vertical direction.

FIGS. 5 and 6 show another embodiment of an acoustic attenuation structure of the invention which differs from the structure illustrated in FIGS. 1 and 2 in that the plurality of partitions and the acoustic skin are formed as a single part. More precisely, the acoustic attenuation structure 300 here comprises an acoustic skin or plate 310, a complex acoustic multi-element panel 320, a plurality of partitions 331 and a closing skin or plate 340.

The closing plate 340 can be a component element of the acoustic attenuation structure as in the example described here or correspond to a structure of an object, for example an aircraft engine. In the latter case, the acoustic attenuation structure of the invention does not include any closing skin and is directly mounted on the structure of the object.

The acoustic skin 310 here comprises a plurality of perforations 311 to let pass the sound waves to be attenuated inside the acoustic attenuation structure 300.

The complex acoustic multi-element panel 320 is formed as a single part and extends in length and in width along a horizontal direction $D_H$ and in a height along a vertical direction $D_V$. The complex acoustic multi-element panel comprises a complex acoustic element 321 each having a shape gradually narrowing between a base 322 and a tip 323. In the example described here, the complex acoustic elements 321 have a truncated cone shape. The base 322 of each complex acoustic element 321 is in continuous contact with the base of the adjacent complex acoustic elements in such a way as to form a continuous network of edges 324.

In the exemplary embodiment described here, the plurality of partitions 331 and the closing skin 340 are produced as a single part, a network of ribs 330 being present on the inner surface of the closing skin 340.

The acoustic attenuation structure 300 is produced by assembling the complex acoustic multi-element panel 320 with the part joining the plurality of partitions 331 and the closing skin 340, the upper edge 331a of the partitions 331 being attached, for example by bonding or soldering, onto the lower portion 322b of the bases 322 of the complex acoustic elements 321 (FIG. 6). The plurality of complex acoustic elements being formed as a single part within the complex acoustic multi-element panel and the plurality of partitions being itself also formed as a single part with the acoustic skin, the assembly of these elements together with one another is greatly facilitated by the self-positioning of the complex acoustic elements with the partitions.

The acoustic skin 310 is attached, by bonding or soldering, onto the upper portion of the bases 322 of the complex acoustic elements 321 corresponding to the exposed surface of the edges 324. Thus, the acoustic skin is attached on a support which is completely flat along the horizontal direction $D_H$, which makes it possible to ensure a very good seal between the skins and the assembly of the complex acoustic multi-element panel with the plurality of partitions.

Once assembled, the attenuation structure 300 comprises a plurality of acoustic cells 350 each formed by a complex acoustic element 321 and the partitions 331 which surround it (FIG. 6). The height $H_{321}$ of the complex acoustic elements 321 is less than the height $H_{350}$ of the acoustic cells 350. More precisely, the height $H_{321}$ of the complex acoustic elements is between 10% and 99% of the height $H_{350}$ of the acoustic cells along the vertical direction.

According to a variant embodiment, the plurality of partitions can also be formed as a single part with the closing skin.

In accordance with the invention, the complex acoustic multi-element panel is produced by injection of a filled or unfilled thermoplastic or thermosetting material. Manufacturing by injection makes it possible to control the overall mass of the structure since the complex acoustic elements can be formed with very small thicknesses, for example in the order of 1 mm.

According to a particular feature of the method of the invention, the complex acoustic multi-element panel is produced by injection-compression of a filled or unfilled thermoplastic or thermosetting material. Injection-compression consists in injecting the material into a partially open mold. Thus, even if the material sets it, the channels become less closed off. When the material is distributed through the whole of the mold, it is completely closed (by a closing effort) to return to the correct side. This makes it possible to obtain wall thicknesses for the complex acoustic multi-element panel that are thinner than with a conventional injection method. Specifically, according to the standard injection method, a hot material (temperature above the melting point) is injected into a "cold" mold at a temperature below the melting point (for example at 250° C. for a thermoplastic material injected at 365° C.). The material will quickly set in the tooling, leading to an increase in its viscosity. When one injects into a tooling with small thicknesses, the pressures needed for injection become significant because the material sets and closes off the channels. Injection-compression makes it possible to obtain thicknesses of walls in complex acoustic multi-element panels between 0.1 mm and 0.5 mm.

According to another particular feature of the method of the invention, the complex acoustic multi-element panel is produced by injection, with controlled tooling temperature, of a filled or unfilled thermoplastic or thermosetting material. Injection with controlled tooling temperature consists in controlling the tooling temperature or the mold temperature by means of the servo system for the tooling temperature (for example with a heat-bearing fluid, air, etc.) The material is injected for example in a tooling kept at 280° C. then when the latter is filled its temperature is lowered to 250° C. The part is then ejected from the tooling. In a conventional injection method, the tooling temperature/mold is quite low compared to the melting temperature in order to optimize the cycle time, namely to reduce the time to set the material and therefore the time to unmold the part. Injection with controlled tooling temperature makes it possible to obtain wall thicknesses in complex acoustic multi-element panels between 0.1 mm and 0.5 mm.

The thermoplastic materials that can be used for the injections described above are in particular polyaryletherketones (PAEK) such as polyetheretherketone (PEEK) and polyetherketoneketone (PEKK).

The thermosetting materials that can be used for the injections described above are in particularly epoxides or polybismaleimides (BMI).

The plurality of partitions, the acoustic and closing skins and the assemblies joining as a single part the plurality of partitions and the complex acoustic multi-element panel or the plurality of partitions and one of the skins can also be produced by injection of a filled or unfilled thermoplastic or thermosetting material.

The invention claimed is:

1. A method for manufacturing an acoustic attenuation structure comprising a complex acoustic multi-element panel extending along a horizontal direction and a vertical direction and at least one acoustic skin covering one of horizontal faces of the complex acoustic multi-element panel, said complex acoustic multi-element panel comprising a plurality of complex acoustic elements each having a shape gradually narrowing between a base and a tip and a plurality of partitions surrounding each complex acoustic element so as to form a plurality of acoustic cells, said plurality of partitions extending along the vertical direction from the base of the complex acoustic elements, at least the complex acoustic multi-element panel being produced by injection of a filled or unfilled thermoplastic or thermosetting material, wherein the acoustic attenuation structure further comprises a closing skin covering the horizontal face of the complex acoustic multi-element panel opposite the horizontal face covered by the acoustic skin, the method comprising producing each of the plurality of partitions and the closing skin together as a single part by injection of a filled or unfilled thermoplastic or thermosetting material and wherein the base of each complex acoustic element is in continuous contact with the base of the adjacent complex acoustic elements so as to form a continuous network of edges, an upper edge of the plurality of partitions extends from a lower portion of the bases of the plurality of complex acoustic elements along the vertical direction.

2. The method as claimed in claim 1, wherein the plurality of partitions and the closing skin are produced as a single part by injection-compression of a filled or unfilled thermoplastic or thermosetting material.

3. The method as claimed in claim 1, wherein the plurality of partitions and the closing skin are produced as a single part by injection with controlled tooling temperature of a filled or unfilled thermoplastic or thermosetting material.

4. The method as claimed in claim 1, further comprising the assembly of the complex acoustic multi-element panel with the plurality of partitions and the closing skin.

* * * * *